(12) United States Patent  
Peters et al.

(10) Patent No.: US 9,120,175 B2
(45) Date of Patent: Sep. 1, 2015

(54) METHOD TO IMPROVE GMAW AND GTAW WELDING PERFORMANCE

(71) Applicant: LINCOLN GLOBAL, INC., City of Industry, CA (US)

(72) Inventors: Steven R. Peters, Huntsburg, OH (US); George B. Koprivnak, Painesville, OH (US); Robert L. Dodge, Mentor, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 309 days.

(21) Appl. No.: 13/670,881

(22) Filed: Nov. 7, 2012

(65) Prior Publication Data

US 2013/0119034 A1    May 16, 2013

Related U.S. Application Data

(60) Provisional application No. 61/559,357, filed on Nov. 14, 2011.

(51) Int. Cl.
| | |
|---|---|
| *B23K 13/08* | (2006.01) |
| *B23K 9/10* | (2006.01) |
| *B23K 9/167* | (2006.01) |
| *B23K 9/173* | (2006.01) |

(52) U.S. Cl.
CPC .............. *B23K 13/08* (2013.01); *B23K 9/1043* (2013.01); *B23K 9/167* (2013.01); *B23K 9/173* (2013.01)

(58) Field of Classification Search
USPC ............... 219/130.1, 130.21, 130.33, 130.51, 219/130.32, 137 PS
See application file for complete search history.

(56) References Cited

U.S. PATENT DOCUMENTS

| | | | |
|---|---|---|---|
| 4,046,987 A | 9/1977 | Hashimoto et al. | |
| 6,051,810 A * | 4/2000 | Stava | 219/137 PS |
| 7,304,269 B2 | 12/2007 | Fulmer et al. | |
| 2014/0001166 A1 | 1/2014 | Peters et al. | |

FOREIGN PATENT DOCUMENTS

| | | |
|---|---|---|
| EP | 1023965 A2 | 8/2008 |
| WO | 2008/140398 A1 | 11/2008 |

OTHER PUBLICATIONS

International Search Report and Written Opinion dated Mar. 26, 2013.

* cited by examiner

*Primary Examiner* — Brian Jennison
(74) *Attorney, Agent, or Firm* — Perkins Coie LLP

(57) ABSTRACT

A method of controlling a power source includes providing a power supply module. The power supply module includes a first circuit that has at least one first switch. The first circuit is configured to provide a welding current to an electrode of a welding system. The power supply module also has a second circuit that includes a load that is operatively connected to at least one second switch. The second circuit is configured to provide the welding current to the electrode through the load. The method also includes controlling the at least one first switch such that the welding current flows through the at least one first switch and to the electrode during a ramp up portion of a welding waveform and such that no current flows through the at least one first switch during a ramp down portion of the welding waveform. The method further includes controlling the at least one second switch such that the welding current flows through the load and to the electrode during the ramp down portion of the welding waveform. The ramp down portion takes the welding current to a predetermined value.

20 Claims, 8 Drawing Sheets

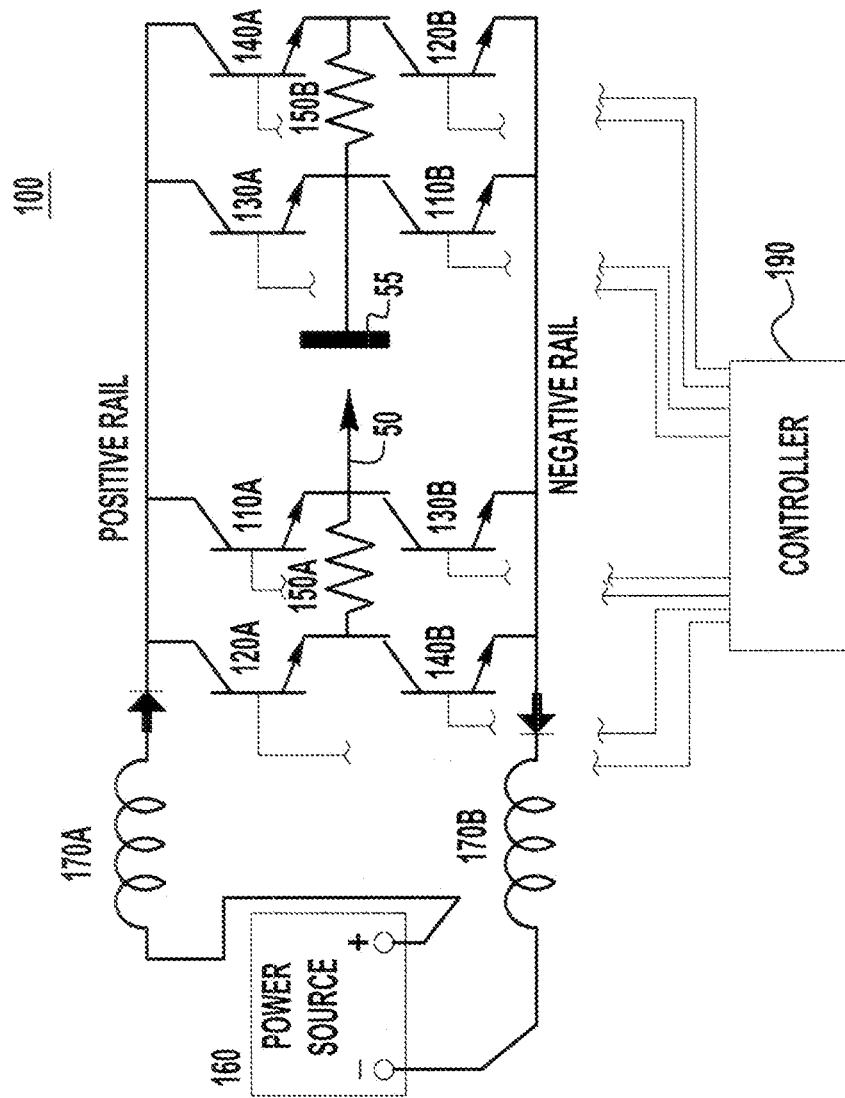

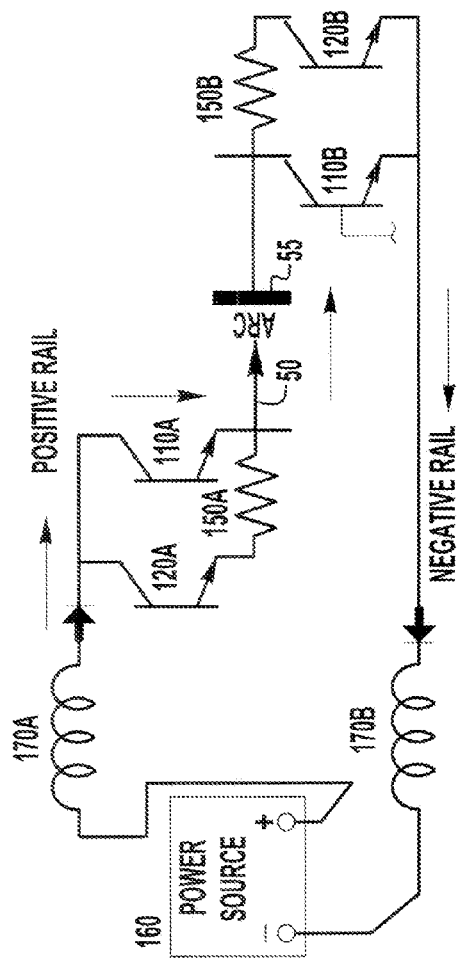
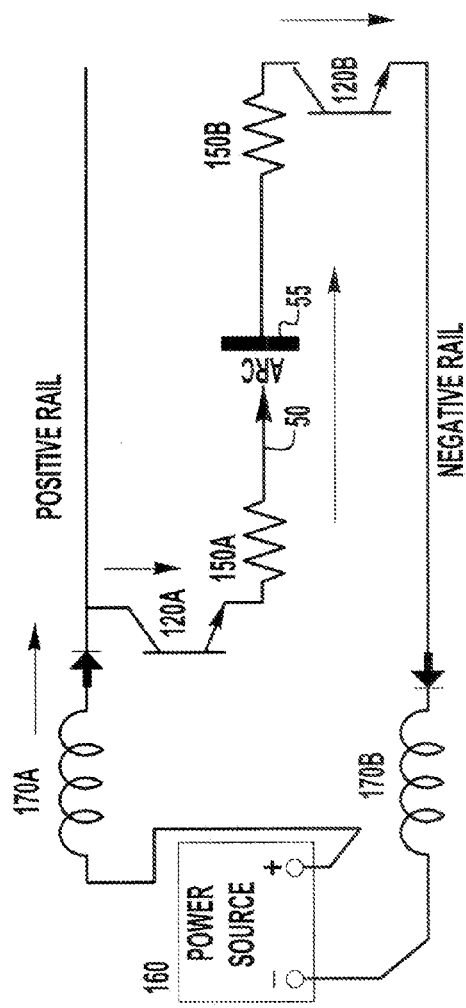
FIG. 2A
FIG. 2B

METHOD TO IMPROVE GMAW AND GTAW WELDING PERFORMANCE

PRIORITY

The present application claims priority to U.S. Provisional Patent Application No. 61/559,357, which is incorporated herein by reference in its entirety.

TECHNICAL FIELD

Certain embodiments relate to welding systems, devices, and processes. More particularly, certain embodiments relate to a system for and method of controlling gas-shielded tungsten arc welding (GTAW or TIG) and gas-shielded metal arc welding (GMAW or MIG).

BACKGROUND

Welding systems include inductance either in the form of parasitic inductance due to, e.g., inductance found in welding leads and other components or in the form of intentionally added inductors as energy-storage devices. Regardless of the form, inductance resists changes in the current. In conventional "steady-state" welding processes, inductance in a welding system was desirable as it helped stabilize the process. However, many modern welding processes such as AC-TIG and rapid-arc MIG welding requires fast changes in the welding current, but the inductance in the welding systems resists these changes. That is, whenever the current must transition from a high level to a low level quickly, inductance in the circuit can retard the change. When transitioning from a low current to a high current, any undesirable inductance can be overcome by increasing the voltage to drive the current faster. However, the transitions from high current to low current cannot be similarly forced. Even if the power source is turned off, the current freewheels through the system due to the inductance. Accordingly, becomes a controlling factor in AC TIG, rapid arc pulsed GMAW, pulsed TIG, and other systems.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Exemplary embodiments of the present invention comprise a method of controlling a power source that includes providing a power supply module. The power supply module includes a first circuit that has at least one first switch. The first circuit is configured to provide a welding current to an electrode of a welding system. The power supply module also has a second circuit that includes a load that is operatively connected to at least one second switch. The second circuit is configured to provide the welding current to the electrode through the load. The method also includes controlling the at least one first switch such that the welding current flows through the at least one first switch and to the electrode during a ramp up portion of a welding waveform and such that no current flows through the at least one first switch during a ramp down portion of the welding waveform. The method further includes controlling the at least one second switch such that the welding current flows through the load and to the electrode during the ramp down portion of the welding waveform. The ramp down portion takes the welding current to a predetermined value.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIG. 1 illustrates an exemplary power supply circuit that is consistent with the present invention;

FIGS. 2A-2D are exemplary current flow diagrams illustrating the operation of the exemplary power supply circuit of FIG. 1.

DETAILED DESCRIPTION

Figure 2C:
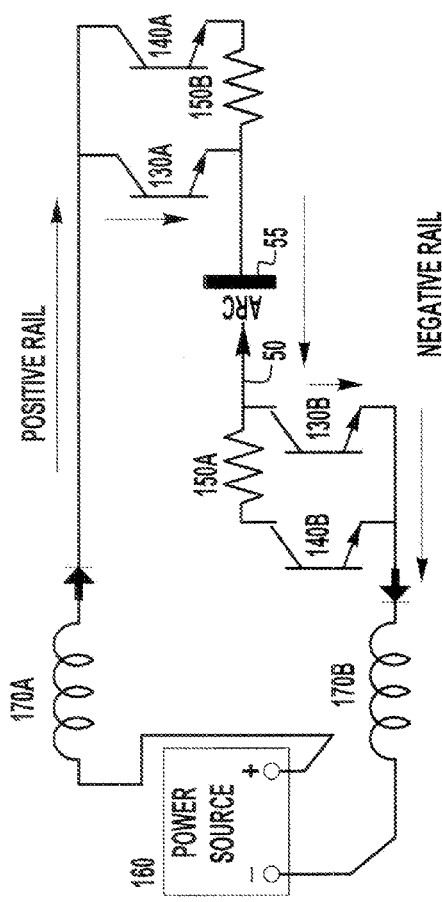

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It is to be understood that the following description is exemplary and is intended to provide explanation of the invention. However, the invention is not limited to the exemplary description.

The present invention relates to a power control circuit for welding, and more particularly, to a power control circuit that improves the performance of gas metal arc welding (GMAW) and gas tungsten arc welding (GTAW). Exemplary embodiments of the present invention are to an improved power control circuit that can rapidly switch between positive and negative polarities and/or reduce current in a welding system without undue complexity.

As illustrated in FIG. 1, power supply circuit 100 includes switches 110A/B, 120A/B, 130A/B, and 140A/B, dropping resistors 150A/B, power supply 160, and inductors 170A/B, which can represent additional inductors that have been added to power supply circuit 100. In addition, the power supply circuit 100 can include parasitic inductance due to, e.g., welding leads, etc. A switch controller 190 is used to control switches 110A/B, 120A/B, 130A/B, and 140A/B based on e.g., a weld table or some other control logic. The switch controller 190 can use any type of known control logic to control the operation of the switches and can be integral to, or communicate with, the power source 160 to ensure proper operation of the switches. For example, the switch controller can be a state based controller which uses state tables or lookup tables to control the operation of the switches as needed for clearing short circuit events, switching welding polarity, creating welding pulses or plasma boosts, etc. The switch controller can be any system or controller, which is capable of quickly opening and closing the switches 110A/B, 120A/B, 130A/B, and 140A/B. For example, the controller can be of the type disclosed in co-pending application Ser. No. 13/534,119, which is incorporated herein by reference in its entirety. The switches 110A/B, 120A/B, 130A/B, and 140A/B can be, for example, IGBT type switches.

In some embodiments, the inductors 170A/B store energy that can be used for arc re-initiation. As indicated above, in addition to inductors 170A/B, welding systems can include parasitic inductance typically found in welding power supply. In some cases, the welding system's parasitic inductance can also assist in re-igniting the arc. The power source 160 can be any known type of GMAW or GTAW welding power source, which is capable of outputting a welding or cutting signal. In exemplary embodiments of the present invention the power source 160 is a power source capable of outputting a DC welding current. However, other types of power sources can be used with power supply circuit 100. Although, in FIG. 1, the switches 110A/B, 120A/B, 130A/B, and 140A/B, resistors 150A/B, inductors 170A/B and switch controller 190, are shown outside of the power source 160 (for clarity purposes), in exemplary embodiments of the invention these components can be made integral with the power source 160. Alternatively, these components can be located in a separate polarity module that is separate from the power source 160. In such embodiments the polarity module (with at least these components) can be coupled to the output of the power source 160 to achieve the operations as discussed herein. Thus, embodiments of the present invention are capable of using a DC only power source 160 and allowing the power source to weld as an AC/DC or opposite polarity power source. Accordingly, the power circuit 100 can be incorporated into numerous welding systems, e.g., AC TIG, DC pulse TIG, rapid arc MIG, etc. Of course, those skilled in the art can use the present invention with other types of power sources.

As indicated above, the operational state of switches 110A/B, 120A/B, 130A/B, and 140A/B is determined by the switch controller 190. Specifically, switches 110A/B, 120A/B, 130A/B, and 140A/B are either turned on or off in order to achieve at least one of the operational states of the power control circuit 100. In a first operational state, switches 110A/B and 120A/B are turned on (closed) and switches 130A/B and 140A/B are turned off (open) such that a positive polarity is applied to the electrode 50. In a second state, a switched load is introduced to the circuit. For example, switches 110A/B are turned off and switches 120A/B are turned on (or simply remain on) in order to direct current through the resistors 150A/B. In the first and second states there is a current flow of one polarity, which can be, for example, a positive current flow such that the electrode 50 is positive with respect to the workpiece 55. In a third state, switches 130A/B and 140A/B are turned on and switches 110A/B and 120A/B are turned off such that a negative (opposite) polarity is applied to the welding arc. In a fourth state, a switched load is introduced. For example, switches 130A/B are turned off and switches 140A/B are turned on (or simply remain on) in order to direct current through the resistors 150A/B. Such a circuit design allows power supply circuit 100 to rapidly transition between opposite polarities and/or reduce current from a relatively high level to a relatively low level during welding, while maintaining a welding arc.

In exemplary embodiments, the switched load, e.g., dropping resistors 150A/B, are used to rapidly reduce the current, e.g., when switching between positive and negative polarity states or when transitioning from a peak current value to a background current value. By turning off switches 110A/B and turning on switches 120A/B (or keeping switches 120A/B on), the current is forced to flow through the load, e.g., dropping resistors 150A/B. Similarly, by turning off switches 130A/B and turning on switches 140A/B (or keeping switches 130A/B on), the current is again forced to flow through the load, e.g., dropping resistors 150A/B, but in the opposite direction in this embodiment. In both cases, the current and the voltage drop as the current flows through the load, e.g., dropping resistors 150A/B.

FIG. 2A illustrates the operation of power supply circuit 100 when a positive polarity is applied to the electrode 50 (controller 190 is not shown for clarity). As shown in FIG. 2A, switches 110A/B and 120A/B are turned on (closed) and switches 130A/B and 140A/B are turned off (open) such that current flows along the positive rail to the first switch 110A then through the welding electrode 50 (whether the electrode 50 is a filler wire in a GMAW system or non-consumable electrode in a GTAW system) and then into the workpiece 55. From the workpiece 55, the current then flows to the second switch 110B and into the negative rail and back to the power source 160. In this embodiment, even though the switches 120A/B are closed, the current primarily flows through the switches 110A/B because of the presence of the resistors 150A/B. In an exemplary embodiment of the present invention, the resistors 150A/B are in the range of 1 to 2 ohms, but the resistors 150A/B can be other values depending on the desired characteristics of the system, e.g., the desired background current and/or the desired switching current. In a further exemplary embodiment, the resistors 150A/B are chosen such that the current through the resistors can range from 5 to 90 amps. In some exemplary embodiments, the current can range from 30 to 50 amps. In other exemplary embodiments the switches 120A/B can also be open as current is flowing through the switches 110A/B or at least a portion of the time the current is flowing through switches 110A/B.

FIG. 2B illustrates the operation of power supply circuit 100 to introduce a switched load that can rapidly decrease the current flowing through the welding arc (controller 190 is not shown for clarity). In order to rapidly reduce the current, switches 110A/B are turned off (opened) and switches 120A/B are turned on (closed). Of course, if the switches 120A/B are already closed (as shown in FIG. 2A) they simply remain closed. When the switches 120A/B are closed and switches 110A/B are open the current flows through the resistors 150A/B and is rapidly reduced. The utilization of the positive and negative rail is similar to that described above except that current is flowing through the switches 120A/B and resistors 150A/B. Power supply circuit 100 can be utilized to rapidly decrease the welding current when desired, e.g., when a short circuit is detected, to transition from a peak current to a background current, to switch from one polarity to another, etc. If it is desired to maintain the same polarity but restore normal current flow, e.g., when the short is cleared, the switches 110A/B can be closed so that current flow is that as shown in FIG. 2A.

FIG. 2C illustrates the operation of power supply control circuit 100 when a negative polarity is applied to the electrode 50 with respect to workpiece 55. As shown in FIG. 2C, switches 130A/B and 140A/B are turned on (closed) and switches 110A/B and 120A/B are turned off (open) such that current flows along the positive rail to the first switch 130A, through the workpiece 55 and into the electrode 50 and then into the second switch 130B and the power source 160, via the negative rail. The operation and utilization of this circuit is similar to that in FIG. 2A except the flow of the current is opposite through the welding arc. Thus, although the output of the power source 160 remain consistent with respect to its output polarity, the switches in power supply circuit 100 can be operated to provide either positive or negative polarity to electrode 50.

Figure 2D:
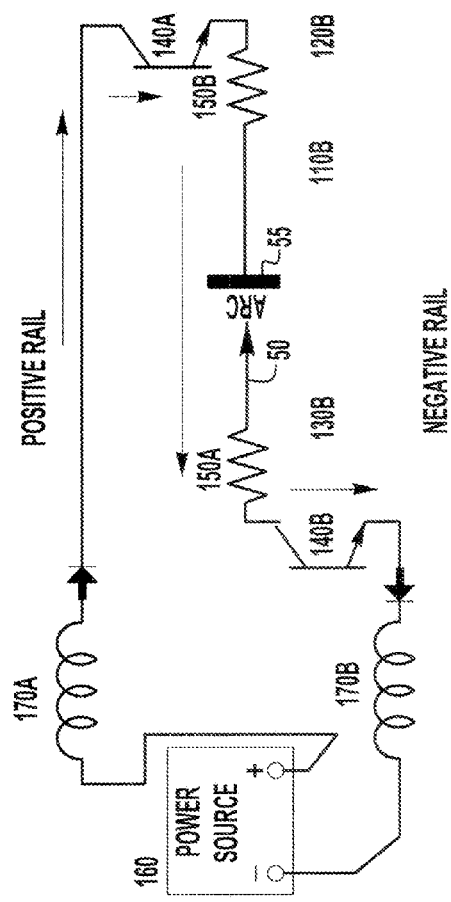

FIG. 2D illustrates the operation of power supply circuit 100 to introduce a switched load to rapidly decrease the current flow when desired, e.g., when a short circuit is detected, to transition from a peak current to a background current, to switch from one polarity to another, etc. In the state illustrated in FIG. 2D, the electrode 50 has a polarity that is opposite to that shown in FIG. 2B. In order to rapidly decrease current, switches 130A/B are opened and switches 140A/B are closed (or remain closed). Thus, the current is rapidly decreased because of dropping resistors 150A/B. The current flows along the positive rail to the first switch 140A, through the resistor 150B into the workpiece 55 and then the electrode 50, through the resistor 150A and second switch 140B, and then along the negative rail to the power source 160. If it is desired to maintain polarity but restore normal current flow, e.g., after a short is cleared, the switches 130A/B can be reclosed so that the desired welding current flow is resumed.

In some embodiments, the power circuit 100 can be used to switch polarities after the welding current has been brought down to a desired level. For example, the system can transition from the state in FIG. 2A, where the electrode 50 is at a positive polarity to the state in FIG. 2C, where the electrode 50 is at a negative polarity. Prior to the transition in polarity, a switched load can be introduced into the welding system, e.g., the state in FIG. 2B, in order to rapidly decrease the current. As current transitions from one polarity to another (e.g., positive to negative), it passes through a 0 amp current level which means that the arc is extinguished. However, because of the presence of the system inductance and/or inductors 170A/B the current is kept flowing through the gap between electrode 50 and workpiece 55 such that the arc is relit very quickly. That is, the inductors 170A/B (and/or the system inductance) provide a voltage level that can very rapidly relight the arc after the polarity transition occurs.

In exemplary embodiments of the present invention, when there is a polarity change there can be an overlap between the closing and opening of the switches such that at least the set of switches 120A/B and 130A/B and the set of switches 140A/B and 110A/B are both closed at the same time. In some exemplary embodiments, this overlap has a duration in the range of 10 to 20 μs. This overlap can aid in the transition from one polarity to another.

As described above, exemplary embodiments of the present invention can be utilized to rapidly reduce welding current, e.g., when a short circuit is detected, to transition from a peak current to a background current, to switch from one polarity to another, etc., even though the output of the power source 160 can remain constant. In addition, the polarity on the electrode 50 can be changed and can be done for any number of reasons. The polarity change can be conducted at many different points during a welding waveform, for example at a background level, during a short circuit event, after a short is cleared, etc. In some exemplary embodiments, the circuit described above can be used to clear a short circuit in an opposite polarity. For example, if welding is being done with a positive polarity (e.g., FIG. 2A) a detected short circuit can be cleared in a negative polarity (e.g., FIGS. 2C and 2D).

Figure 3A:
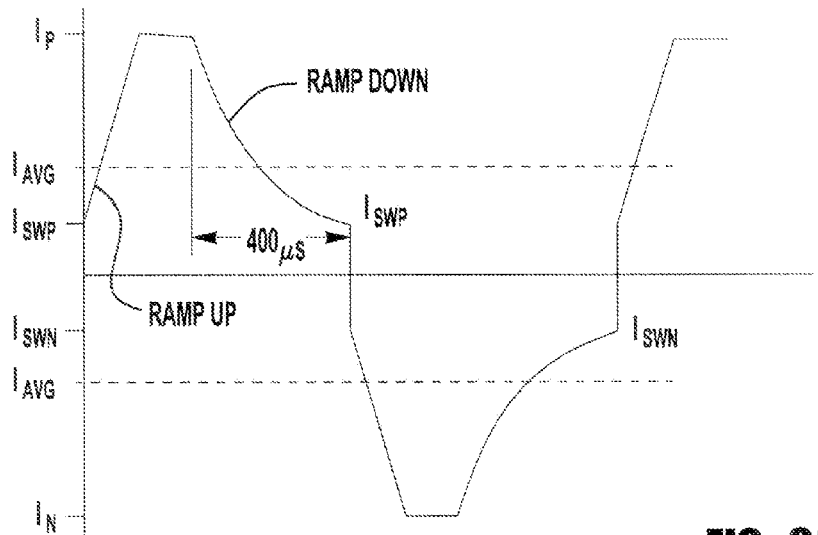
FIG. 3A illustrates a prior art AC-TIG waveform.

Exemplary embodiments and methods of switching current polarity will now be discussed with respect to various applications. FIG. 3A illustrates a prior art welding current waveform in a typical AC GTAW (also known as AC TIG) system. The ramp up portion of the waveform is controlled by the power source and the voltage of the power source and the inductance (e.g., from inductors and parasitic inductance) seen by the power source will set the ramp rate. The current will ramp up to a desired value $I_P$ for a desired amount of time before the power supply circuit switches polarities to $I_N$. The typical AC-TIG power supply circuit will switch polarities at a predetermined frequency of, e.g., 500 Hz. Although higher switching frequencies are desirable, the maximum frequency can be limited by the inductance in the power supply circuit, which controls how fast the welding current will ramp down. This is because, before switching polarities on the welding current, it is desirable to drop from the welding current from its high level ($I_P$, $I_N$) to a current value ($I_{SWP}$, $I_{SWN}$) that is safe for the switches, e.g., IGBT switches, and other components in the welding circuit. For example, the welding current $I_P$, $I_N$ can from about 100 amps RMS to about 600 amps RMS and the switching current $I_{SWP}$, $I_{SWN}$ can range from about 10 amps to 100 amps, but can be as high as 200 amps in some circuits. In some embodiments, the welding current $I_P$, $I_N$ can be about 300 amps RMS and the switching current $I_{SWP}$, $I_{SWN}$ can be about 25 amps. The inductance in the power supply circuit will control how fast the welding current drops to the level $I_{SWP}$, $I_{SWN}$. For example, depending on the value of inductors 170A/B and the parasitic inductance, it may take e.g., 100 μs to 400 μs for the current to drop to an acceptable level, e.g., from about 300 amps to about 25 amps. Accordingly, the welding current will need to transition earlier than if there was no inductance in the system.

However, if the welding current is transitioned earlier in order to account for this inductance, the current value $I_P$, $I_N$ must be set higher in order to attain the same average welding current $I_{AVG}$. As the welding frequency gets higher, e.g., up to 1000 Hz, the current $I_P$, $I_N$ (and the corresponding voltage that is driving current $I_P$, $I_N$) will need to be set even higher. This creates problems in that, not only will the power supply need to be larger to handle the higher current, but the tungsten electrode will tend to spit if the current is too high.

Figure 3B:
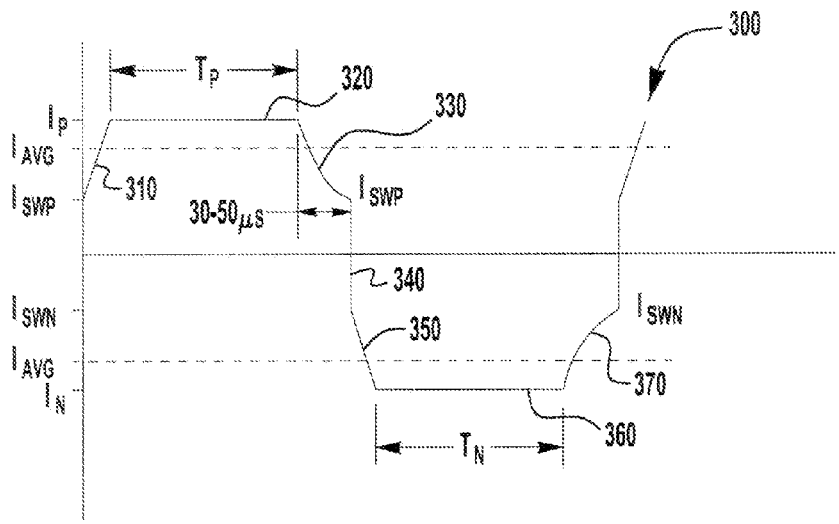
FIG. 3B illustrates an exemplary AC-TIG welding current waveform that is consistent with the present invention.

Exemplary embodiments of the present invention will rapidly dissipate the energy stored in the inductance to provide fast transitions at lower peak current. That is, in the states shown in FIGS. 2B and 2D, the welding current will dissipate to the switching point $I_{SWP}$, $I_{SWN}$ much faster than conventional systems. For example, FIG. 3B illustrates an AC-TIG welding current waveform 300 that is consistent with the present invention. As shown in FIG. 3B, the transition time from the peak current $I_P$, $I_N$ to the switch point $I_{SWP}$, $I_{SWN}$, respectively, is less. This is because, as discussed further below, the welding current is forced through resistors 150A/B prior to changing polarity. Accordingly, a system that would have taken, e.g., 400 μs for the current to drop to the transition point $I_{SWP}$, $I_{SWN}$ may only take, e.g., 30 to 50 μs in an embodiment that is consistent with the present invention. A transition time of 400 μs would be unacceptable for frequencies approaching 1000 Hz and beyond, as the transition time would nearly equal the half-cycle time, e.g., at 1000 Hz, the half-cycle time is 500 μs. In contrast, the present invention can provide transition times in the 30 to 50 μs range. Therefore, because this transition time is much less, exemplary embodiments of the present invention can allow systems to operate much higher than 500 Hz, e.g., up to 1500 Hz, which has a half-cycle time of about 333 µs, or at higher frequencies. In addition, the peak current $I_P$, $I_N$ in embodiments consistent with the present invention can be set lower than the peak current $I_P$, $I_N$ of conventional systems. That is, because the lower peak value $I_P$, $I_N$ in FIG. 3B is maintained for a longer period of time than in a conventional system (compare $I_P$, $I_N$ of FIG. 3A with $I_P$, $I_N$ of FIG. 3B), the desired average welding current $I_{AVG}$ can be achieved with a lower peak current $I_P$, $I_N$. Thus, the peak currents and the corresponding power supplies of embodiments consistent with the present invention can be smaller than those found in conventional systems.

Figure 4:
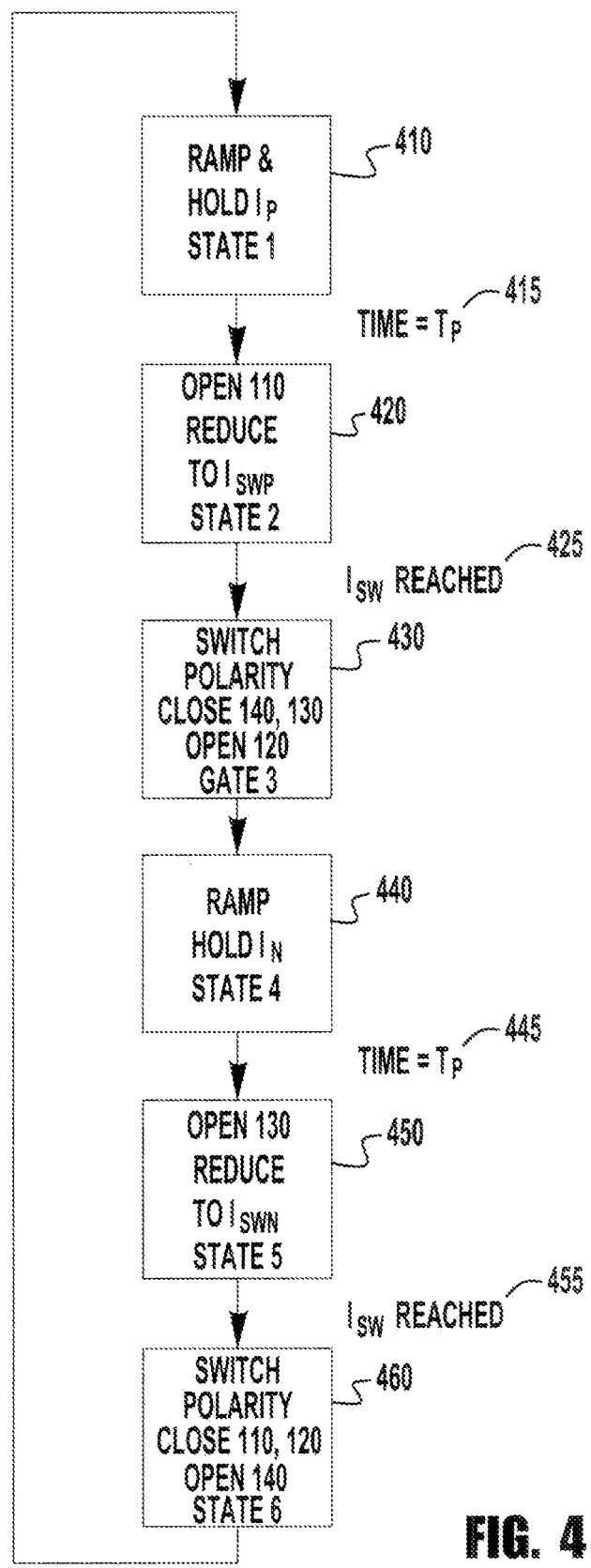
FIG. 4 illustrates an exemplary welding state table that can implement the welding current waveform of FIG. 3B.

FIG. 4 illustrates an AC-TIG weld state stable that is consistent with the present invention and can implement the AC-TIG waveform of FIG. 3B. The weld state table can be incorporated into controller 190, which can be, e.g., a controller disclosed in co-pending application Ser. No. 13/534,119. Accordingly, only control features pertinent to the present invention will be further discussed.

At state 1 (410), the welding current waveform is ramped up to a value $I_P$ (ramp up portion 310 of waveform 300 in FIG. 3B). As discussed above, although the inductance (added inductors and parasitic inductors) in the welding system will resist the ramp up 310 of the welding current, the ramp rate can still be set to a desired value by increasing the voltage output of the welding power source 160. However, unlike a conventional system, the current will be ramped to a lower peak value where it is held for a duty cycle time $T_P$ (peak current portion 320 of waveform 300). During state 1 (410), the switches 110A/B to 140A/B will be in the state illustrated in FIG. 2A. That is, switches 110A/B will be closed and switches 130A/B and 140A/B will be open. The switches 120A/B can be closed anytime prior to the end of the duty cycle $T_P$. Of course, the switches 120A/B can be closed when the switches 110A/B are closed. After the current $I_P$ has been held for a time equal to the duty cycle time $T_P$ (415), the state table will transition to state 2 (420), where the switches 110A/B are opened with the switches 120A/B remaining closed. During state 2 (420), the switches 110A/B to 140A/B will be in the state illustrated in FIG. 2B. That is, the welding current will go through switches 120A/B and resistors 150A/B. By going through the switched load, e.g., resistors 150A/B, the welding current will ramp down rapidly (ramp down portion 330 of waveform 300). When the welding current ramps down to a value equal to or less than $I_{SWP}$ (425), the weld state table transitions to state 3 (430), where the polarity on electrode 50 is switched.

At state 3 (430), the switches 130A/B are closed and the switches 120A/B are opened. In some exemplary embodiments, switches 120A/B and switches 130A/B overlap during the polarity change. In some embodiments the overlap duration can be between, e.g., 10 to 20 µs. In some embodiments, there is no overlap. During the transition in polarity, the arc will extinguish because the current will go through zero. Because the stored energy in inductors 170A/B are designed to maintain the current flow, the arc gap voltage between electrode 50 and workpiece 55 will increase to reestablish the arc. Once the polarity has been switched (portion 340 of waveform 300), the weld state table will transition to state 4 (440), where the welding current will ramp to a value $I_N$ (portion 350 of waveform 300) As before, the ramp rate can be set to a desired value by increasing the voltage output of power source 160. Once the current reaches the value $I_N$, it is held for a duty cycle time $T_N$ (portion 360 of waveform 300)

During state 4 (440), the switches 110A/B to 140A/B will be in the state illustrated in FIG. 2C. That is, switches 130A/B will be closed and switched 110A/B and 120A/B will be open. The switches 140A/B can be closed anytime prior to the end of the duty cycle $T_N$. Of course, the switches 140A/B can be closed when the switches 130A/B are closed. After the current $I_N$ has been held for a time equal to the duty cycle time $T_N$ (445), the state table will transition to state 5 (450), where the switches 130A/B are opened with the switches 140A/B remaining closed. During state 5 (450), the switches 110A/B to 140A/B will be in the state illustrated in FIG. 2D. That is, the welding current will go through the switches 140A/B and resistors 150A/B as shown in FIG. 2D. By going through resistors 150A/B, the welding current will ramp down rapidly (portion 370 of waveform 300). When the welding current ramps down to a value equal to or less than $I_{SWN}$ (455), the weld state table transitions to state 6 (460), where the polarity on electrode 50 is switched.

At state 6 (460), the switches 110A/B are closed and the switches 140A/B are opened. As discussed above, in some embodiments the switch positions can overlap between, e.g., 10 to 20 µs, during the polarity change. In some embodiments, there is no overlap. As before, the stored energy in inductors 170A/B maintains the current flow and increases the arc gap voltage to reestablish the arc. Once the polarity has been switched, the weld state table will transition back to state 1 (410), where the waveform cycle starts over. Of course, those skilled in the art know of other circuits and methods that can reestablish the arc.

In the above exemplary embodiments, by dissipating the current rapidly prior to a polarity change, the welding system can operate at welding frequencies much higher than 500 Hz, e.g., up to 1500 Hz or higher.

Figure 5:
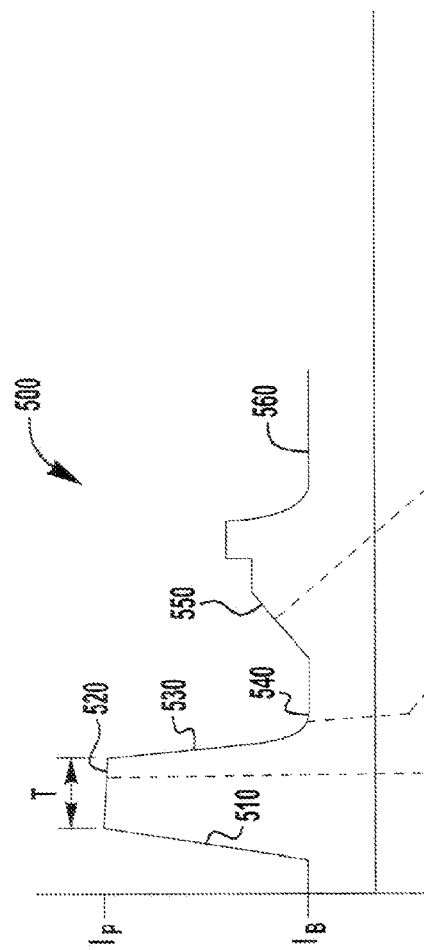
FIG. 5 illustrates an exemplary rapid arc waveform that is consistent with the present invention.
Figure 6:
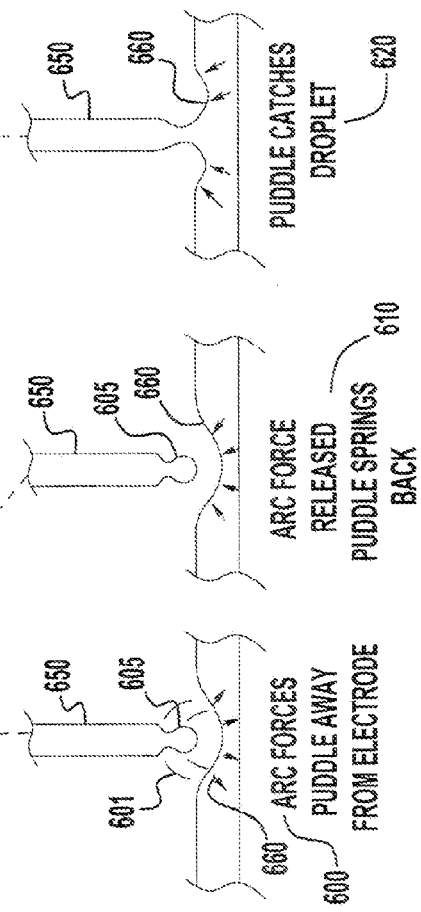
FIG. 6 illustrates weld droplet transfer in a rapid arc process.

Exemplary embodiments of the present invention can also be used in welding applications other than AC-TIG. For example, the power supply circuit 100 can be used in a Rapid Arc MIG system. Rapid Arc depends on a high peak current and a rapid drop to a low background current, i.e., a rapid and big delta change in the welding current. The Rapid Arc process is described in U.S. Pat. No. 7,304,269, which is incorporated herein in its entirety as background material. Accordingly, the Rapid Arc process will not be discussed in detail herein except as needed to describe exemplary embodiments of the present invention. FIG. 5 illustrates an exemplary Rapid Arc waveform 500 that is consistent with the present invention. The waveform is characterized by a ramp up 510 from a background current $I_B$ to a peak current $I_P$ where the peak current $I_P$ is held (portion 520). During this time, as shown in FIG. 6, the consumable electrode is heated by the welding current and arc 601 to form a droplet 605 on the end of the consumable electrode 650. Also during this time, the force of the arc forces the weld puddle 660 away form the electrode 650.

After the peak current $I_P$ is held for a time T (see portion 520 in FIG. 5), the welding current is rapidly returned to the background current $I_B$ (see ramp down portion 530 of waveform 500). Once the arc force from the peak current $I_P$ has been released because the welding current has ramped down to the background current level $I_B$, the weld puddle springs back (see 610 in FIG. 6). When the welding current reaches background current $I_B$ or shortly thereafter (portion 540 of waveform 500), the weld puddle can spring back enough to "catch" the droplet from the electrode and transfers the droplet to the weld puddle (see 620 in FIG. 6). During the time the electrode is shored to the weld puddle, the welding power source initiates a shorting response waveform 550 that will clear the short. Exemplary shorting routines that can be incorporated in the present invention are discussed in U.S. Pat. No. 7,304,269 and will not be further discussed. Once the short is cleared, the welding current is returned to the background value $I_B$ (see portion 560) and the waveform cycle starts over.

In Rapid Arc, the rate at which the welding current falls from its peak value $I_P$ to its background value $I_B$ determines the speed at which the weld puddle springs back to catch the droplet—the faster the weld puddle springs back, the better rapid arc works. Because, as discussed above, inductances in the welding system affect how fast the welding current can drop, exemplary embodiments of the present invention can improve the Rapid Arc welding process.

Figure 7:
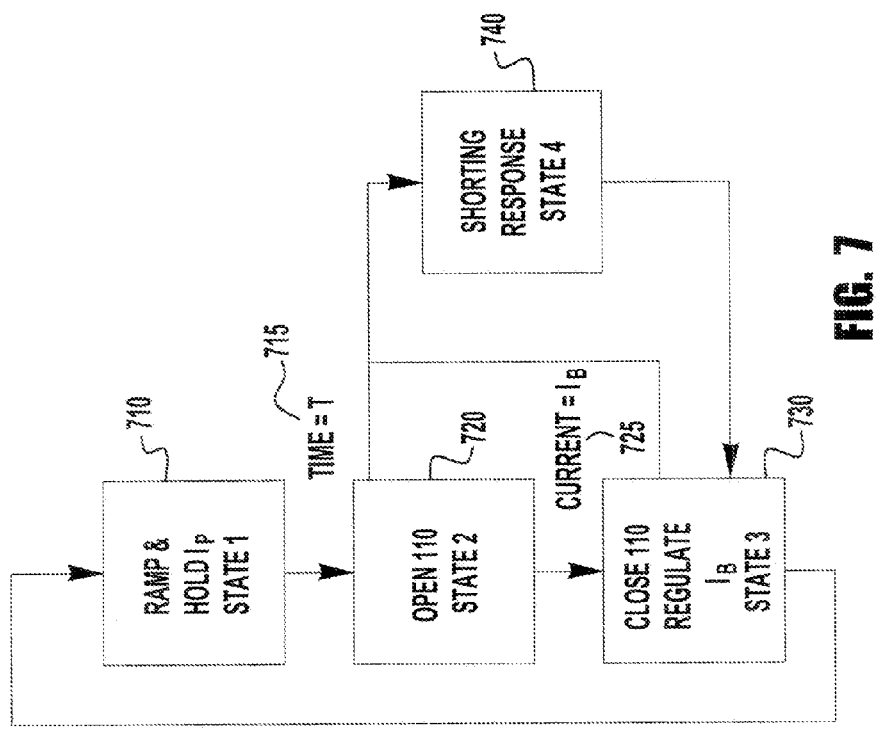
FIG. 7 illustrates an exemplary welding state table that can implement the rapid arc waveform of FIG. 5.

FIG. 7 illustrates a rapid arc MIG weld state stable that is consistent with the present invention and can implement the Rapid Arc waveform of FIG. 5. The weld state table can be incorporated into controller 190, which can be, e.g., a controller disclosed in co-pending application Ser. No. 13/534, 119. Accordingly, only control features pertinent to the present invention will be further discussed.

At state 1 (710), the welding current waveform is ramped up to a value $I_P$ (ramp up portion 510 of waveform 500). As discussed above, although the inductance (added inductors and parasitic inductors) in the welding system will resist the ramp up of the welding current, the ramp rate can still be set to a desired value by increasing the voltage output of the welding power source. The peak current $I_P$ is then held for a time T (portion 520 of waveform 500). During state 1 (710), the switches 110A/B to 140A/B can be in the state illustrated in FIG. 2A (or FIG. 2C if the waveform is of the opposite polarity). For brevity, a positive waveform will be discussed. However, those skilled in the art can readily adapt these teachings to a negative waveform. At state 1 (710), switches 110A/B will be closed and switches 130A/B and 140A/B will be open. The switches 120A/B can be closed anytime prior to the end of the time period T. Of course, the switches 120 A/B can be closed when the switches 110A/B are closed. As discussed above, during the time the current $I_P$ is being held (portion 520), the force of the arc forces the weld puddle away from the electrode as the droplet is being formed (620).

After the current $I_P$ has been held for a time=T (715), the state table will transition to state 2 (720), where the switches 110A/B are opened with the switches 120A/B remaining closed. During state 2 (720), the switches 110A/B to 140A/B will be in the state illustrated in FIG. 2B. That is, the welding current will go through switches 120A/B and resistors 150A/B. By going through resistors 150A/B, the welding current will ramp down rapidly (ramp down portion 530 of waveform 500). At this time, the weld puddle will spring back as discussed above (610). When the welding current ramps down to a value equal to the desired background current $I_B$ (725) (portion 540 of waveform 500), the weld state table transitions to state 3 (730), where the switches 110A/B are closed again. In state 3 (730), the power source regulates the desired background current $I_B$. If, at either state 2 or state 3, the welding system detects that the electrode is shorted to the weld puddle (750 and 755, respectively), the weld state table will transition to state 4 (740), where the power source will initiate a shorting response waveform 550 to clear the short. Once the short is cleared (745), the weld state table transitions to (or back to) state 3 (730), where the power source regulates the background current $I_B$ (portion 560). At the end of the waveform cycle, the weld state table transitions to state 1 (710) and the Rapid Arc welding waveform cycle begins again. In some embodiments, the resistors 150A/B are sized to achieve a different target point current, e.g., 45 amps, than the desired (normal) background current $I_B$ (725) when welding current ramps down at state 2. In some embodiments, this target point current can be held for the entire background time. In other embodiments, the target point current can be held for a predetermined period of time in anticipation of a short, and if none is detected, the weld state table transitions to state 3 where the normal background current $I_B$ is regulated. Of course, if a short is detected when the welding current is at the target point current, the weld state table will transition to state 4. In some embodiments, part of the shorting routine in state 4 will include holding off on closing switches 110A/B.

In the above exemplary embodiments, by providing a faster transition from the peak current $I_P$ to the background current $I_B$ (or another target point current) than in a conventional rapid arc system, the present invention provides a more efficient rapid arc process. For example, in the Rapid Arc system, based on the values of resistors 150A/B, the present invention can provide a ramp down rate that is 30-50 µs, rather than the 100-400 µs of a conventional system.

Figure 8A:
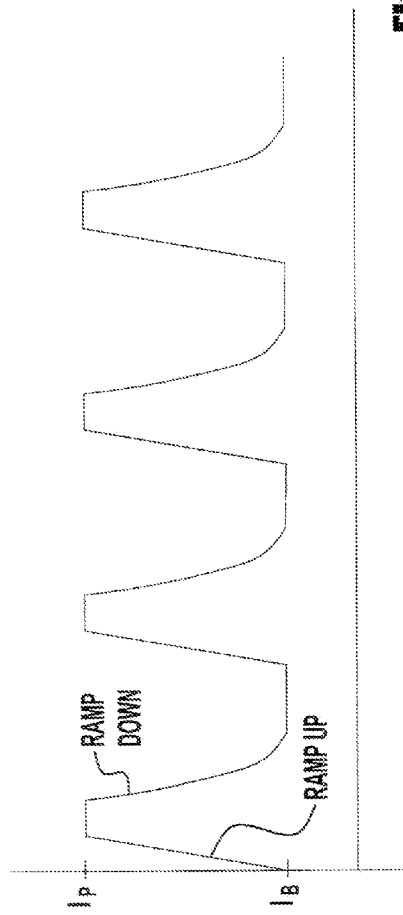
FIG. 8A illustrates a prior at current waveform for a DC pulsed TIG system.

Exemplary embodiments of the present invention can also be used in DC pulsed TIG processes. FIG. 8A illustrates a prior art welding current waveform in a typical DC pulsed TIG system. As discussed above, the ramp up rate of the waveform is controlled by the power source and the voltage of the power source. The current will ramp up to a desired value $I_P$ for a desired amount of time before the current is ramped down to the background current $I_B$. The typical DC pulsed TIG waveform will pulse between the peak current $I_P$ and the background current $I_B$. Thus, for a given peak current $I_P$, the ramp down rate will determine the upper limit of the welding current frequency or how low of a value the background current $I_B$ can be regulated to at high frequencies. In many applications, higher switching frequencies are desirable, as it increases the arc focus. However, as discussed above, the ramp down rate (and the maximum frequency) can be limited by the inductance in the power supply circuit.

Figure 9:
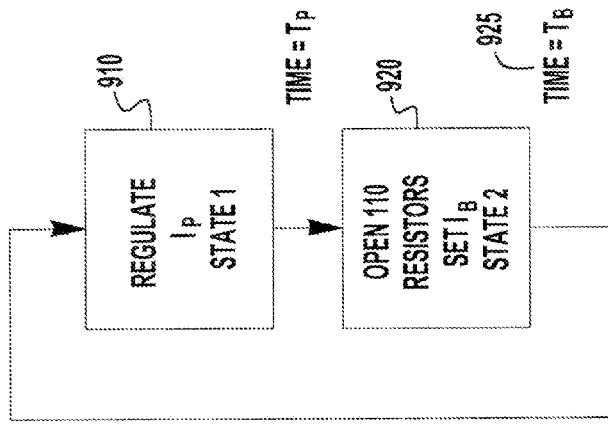
FIG. 9 illustrates an exemplary welding state table for that can implement the welding current waveform of FIG. 8B.
Figure 8B:
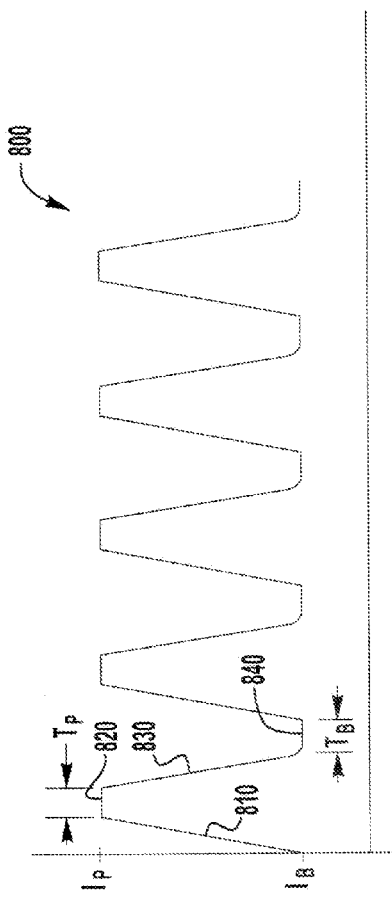
FIG. 8B illustrates an exemplary welding current waveform for a DC pulsed TIG system that is consistent with the present invention.

Similar to the AC-TIG and rapid arc MIG embodiments discussed above, exemplary embodiments of the present invention will rapidly dissipate the energy stored in the inductance in order to provide a fast ramp down rate from the peak current $I_P$ to the background current $I_B$ as shown in FIG. 8B (see ramp down portion 830 of waveform 800). FIG. 9 illustrates an AC-TIG weld state stable that is consistent with the present invention and can implement the DC pulsed TIG waveform 800 of FIG. 8B. Similar to the systems discussed above, the weld state table can be incorporated into controller 190, which can be, e.g., a controller disclosed in co-pending application Ser. No. 13/534,119. Accordingly, only control features pertinent to the present invention will be further discussed.

At state 1 (910), the welding current waveform 800 is ramped up (portion 810) and regulated to a value $I_P$ for a time period $T_P$ (portion 820). During state 1 (910), the switches 110A/B to 140A/B can be in the state illustrated in FIG. 2A (or FIG. 2C if the waveform is of the opposite polarity). Again, for brevity, a positive waveform will be discussed. However, those skilled in the art can readily adapt the teachings to a negative waveform. During state 1 (910), the switches 110A/B to 140A/B will be in the state illustrated in FIG. 2A. That is, switches 110A/B will be closed and switches 130A/B and 140A/B will be open. Again, as before, the switches 120A/B can be closed anytime prior to the end of time period $T_P$. Of course, the switches 120 A/B can be closed when the switches 110A/B are closed. After the current $I_P$ has been held for a time equal to time $T_P$ (715), the state table will transition to state 2 (920), where the switches 110A/B are opened with the switches 120A/B remaining closed. During state 2 (920), the switches 110A/B to 140A/B will be in the state illustrated in FIG. 2B. That is, the welding current will go through switches 120A/B and resistors 150A/B. By going through resistors 150A/B, the welding current will ramp down rapidly (portion 830 of waveform 800) and go to the background current value $I_B$ (portion 840). In addition, the resistors 150A/B will also determine the value of the background current $I_B$. That is, resistors 150A/B are selected such that the background current goes to the desired value $I_B$ (Resistance of (150A+150B)=(power source voltage)/(desired $I_B$)). The waveform 800 will stay at the background current $I_B$ (840) until time equals TB (925). Then the waveform 800 cycle repeats itself by going back to state 1 (910).

In the above the exemplary embodiments of the DC pulsed TIG system, the usable frequency range is expanded on the higher end and can be higher than an AC system because there is no zero crossing, e.g., up to 5000 Hz or higher, and the arc can be more focused.

In the above embodiments, the load (e.g., resistors 150A/B) are illustrated as being connected in series with a switch that is then closed to force the current through the resistor. However, this configuration is not limiting and other configurations may be used. For example, the load may be connected in parallel with a switch that is then opened to force the current through the resistor. In addition, the number of switches, inductors, and loads (e.g., resistors) can be varied without departing form the spirit or scope of the invention. In some exemplary embodiments, circuit protection (not shown) is provided which prevents any of the switches 110, 120, 130 and 140 (or other components) from being damaged by over-voltage and/or overcurrent events.

It will be apparent to those skilled in the art that various modifications and variations can be made in the power source control circuit for welding of the present invention without departing form the spirit or scope of the invention. Thus, it is intended that the present invention cover the modifications and variations of this invention provided they come within the scope of the appended claims and their equivalents.

What is claimed is:

1. A method of controlling an AC TIG power source, comprising:
    providing a power supply module, comprising,
        a first circuit comprising at least one first switch configured to provide a welding current to flow to an electrode of a welding system in a first direction, and
        a second circuit comprising a first load that is operatively connected to at least one second switch, the second circuit configured to provide the welding current to flow to the electrode through the first load in the first direction;
    controlling the at least one first switch such that the welding current flows through the at least one first switch and to the electrode during a first ramp up portion of a welding waveform, and no current flows through the at least one first switch during a first ramp down portion of the welding waveform; and
    controlling the at least one second switch such that the welding current flows through the first load and to the electrode during the first ramp down portion of the welding waveform,
    wherein the first ramp down portion takes the welding current to a first predetermined value.

2. A method of controlling an AC TIG power source, comprising:
    providing a power supply module, comprising,
        a first circuit comprising at least one first switch configured to provide a welding current to an electrode of a welding system,
        a second circuit comprising a first load that is operatively connected to at least one second switch, the second circuit configured to provide the welding current to the electrode through the first load,
        a third circuit comprising at least one third switch configured to provide the welding current to the electrode of the welding system, and
        a fourth circuit comprising a second load that is operatively connected to at least one fourth switch, the fourth circuit configured to provide the welding current to the electrode through the second load;
    controlling the at least one first switch such that the welding current flows through the at least one first switch and to the electrode during a first ramp UP portion of a welding waveform, and no current flows through the at least one first switch during a first ramp down portion of the welding waveform;
    controlling the at least one second switch such that the welding current flows through the first load and to the electrode during the first ramp down portion of the welding waveform,
    wherein the first ramp down portion takes the welding current to a first predetermined value, and
    wherein the welding current flows to the electrode in a first direction when flowing through at least one of the first circuit and the second circuit;
    controlling the at least one third switch such that the welding current flows through the at least one third switch and to the electrode during a second ramp up portion of a welding waveform, and no current flows through the at least one third switch during a second ramp down portion of the welding waveform; and
    controlling the at least one fourth switch such that the welding current flows through the second load and to the electrode during the second ramp down portion of the welding waveform,
    wherein the second ramp down portion takes the welding current to a second predetermined value, and
    wherein the welding current flows to the electrode in a second direction when flowing through at least one of the third circuit and the fourth circuit.

3. The method of claim 2, further comprising:
    controlling the at least one first switch to maintain a first peak current after the first ramp up portion for a first peak time period prior to the controlling of the at least one second switch to initiate the first ramp down portion of the welding waveform.

4. The method of claim 3, further comprising:
    controlling the at least one third switch to maintain a second peak current after the second ramp up portion for a second peak time period prior to the controlling of the at least one fourth switch to initiate the second ramp down portion of the welding waveform.

5. The method of claim 2, further comprising:
    controlling the second switch and the third switch such that both switches are closed for a first overlap time when the welding current reaches the first predetermined value.

6. The method of claim 5, wherein the first overlap time is 10 to 20 µs.

7. The method of claim 2, further comprising:
    controlling the first switch and the fourth switch such that both switches are closed for a second overlap time when the welding current reaches the second predetermined value.

8. The method of claim 7, wherein the second overlap time is 10 to 20 µs.

9. The method of claim 4, wherein a value of the first load is selected such that a duration of the first ramp down portion is in a range of 30 to 50 µs.

10. The method of claim 4, wherein a value of the second load is selected such that a duration of the second ramp down portion is in a range of 30 to 50 µs.

11. The method of claim 4, wherein the welding system is configured to provide the welding waveform at a frequency of up to 1500 Hz.

12. A method of controlling a Rapid Arc power source, comprising:
providing a power supply module, comprising,
a first circuit comprising at least one first switch configured to provide a welding current to flow to an electrode of a welding system in a first direction, and
a second circuit comprising a load that is operatively connected to at least one second switch, the second circuit configured to provide the welding current to flow to the electrode through the load in the first direction;
controlling the at least one first switch such that the welding current flows through the at least one first switch and to the electrode during a ramp up portion of a Rapid Arc welding waveform, and no current flows through the at least one first switch during a ramp down portion of the Rapid Arc welding waveform; and
controlling the at least one second switch such that the welding current flows through the load and to the electrode during the ramp down portion of the Rapid Arc welding waveform,
wherein the ramp down portion takes the welding current to a predetermined value.

13. The method of claim 12, further comprising:
controlling the at least one first switch to maintain a peak current after the ramp up portion for a peak time period prior to the controlling of the at least one second switch to initiate the ramp down portion of the Rapid Arc welding waveform.

14. The method of claim 13, further comprising:
controlling the at least one first switch to maintain the welding current at the predetermined value after the ramp down portion has been completed.

15. The method of claim 13, wherein a shorting routine to clear a short is initiated if the short is detected during the ramp down portion or when the welding current has reached the predetermined value.

16. The method of claim 13, wherein a value of the load is selected such that a duration of the ramp down portion is in a range of 30 to 50 µs.

17. The method of claim 13, wherein the welding system is configured to provide the Rapid Arc welding waveform at a frequency of up to 1500 Hz.

18. A method of controlling a DC pulsed power source, comprising:
providing a power supply module, comprising,
a first circuit comprising at least one first switch configured to provide a welding current to flow to an electrode of a welding system in a first direction, and
a second circuit comprising a load that is operatively connected to at least one second switch, the second circuit configured to provide the welding current to flow to the electrode through the load in the first direction;
controlling the at least one first switch such that the welding current flows through the at least one first switch and to the electrode during a ramp up portion of a DC pulse welding waveform, and no current flows through the at least one first switch during a ramp down portion of the DC pulse welding waveform; and
controlling the at least one second switch such that the welding current flows through the load and to the electrode during the ramp down portion of the DC pulse welding waveform,
wherein the ramp down portion takes the welding current to a predetermined value.

19. The method of claim 18, further comprising:
controlling the at least one first switch to maintain a peak current after the ramp up portion for a peak time period prior to the controlling of the at least one second switch to initiate the ramp down portion of the DC pulse welding waveform.

20. The method of claim 19, wherein a value of the load is selected such that a duration of the ramp down portion is in a range of 30 to 50 µs,
wherein the welding current goes to a predetermined background current based on the value of the load after the ramp down portion is completed, and
wherein the welding system is configured to provide the DC pulse welding waveform at a frequency of up to 5000 Hz.

* * * * *